United States Patent
Hong

(10) Patent No.: US 8,593,837 B2
(45) Date of Patent: Nov. 26, 2013

(54) POWER SUPPLY DEVICE AND METHOD, BASED ON POWER SUPPLY MODE, FOR IMAGE FORMING APPARATUS

(75) Inventor: Hyung-Won Hong, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 269 days.

(21) Appl. No.: 12/659,372

(22) Filed: Mar. 5, 2010

(65) Prior Publication Data

US 2010/0166449 A1 Jul. 1, 2010

(30) Foreign Application Priority Data

Sep. 3, 2008 (KR) .................. 10-2009-0083150

(51) Int. Cl.
*H02M 1/14* (2006.01)
(52) U.S. Cl.
USPC ................. 363/46; 363/48; 320/166
(58) Field of Classification Search
USPC ............... 363/39, 44, 45, 46, 47, 48; 320/166
See application file for complete search history.

(56) References Cited

U.S. PATENT DOCUMENTS

| | | | | |
|---|---|---|---|---|
| 6,577,512 B2 * | 6/2003 | Tripathi et al. | ............ | 363/21.17 |
| 6,680,463 B2 * | 1/2004 | Honda | .......... | 219/501 |
| 7,649,755 B2 * | 1/2010 | Kogel et al. | ............... | 363/21.12 |
| 8,294,428 B2 * | 10/2012 | Kakiuchi | ...................... | 320/166 |
| 2004/0095787 A1 * | 5/2004 | Donaldson et al. | ............. | 363/50 |
| 2008/0007240 A1 * | 1/2008 | Hawley | .......................... | 323/284 |
| 2010/0289439 A1 * | 11/2010 | Kitanaka et al. | .......... | 318/400.26 |
| 2011/0025278 A1 * | 2/2011 | Balakrishnan et al. | ....... | 320/166 |

* cited by examiner

*Primary Examiner* — Adolf Berhane
*Assistant Examiner* — Lakaisha Jackson
(74) *Attorney, Agent, or Firm* — Staas & Halsey LLP

(57) ABSTRACT

Provided is a power supply device for an image forming apparatus, the power supply device including: a filter unit filtering alternating current (AC) power from an AC power source; and a converter generating a direct current (DC) power from the filtered AC power, wherein the filter unit includes: a capacitor connected to the AC power source; a discharge device connected to the capacitor and discharging electric charges accumulated in the capacitor; and a switching device switching connection between the capacitor and the discharge device according to a power supply mode of the power supply device.

22 Claims, 7 Drawing Sheets

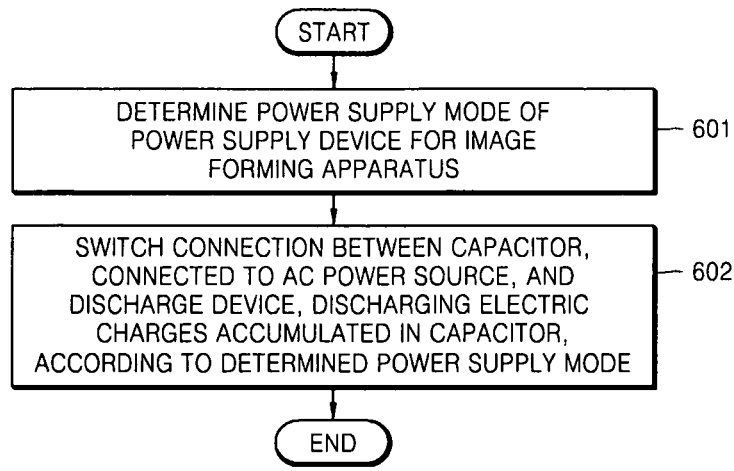
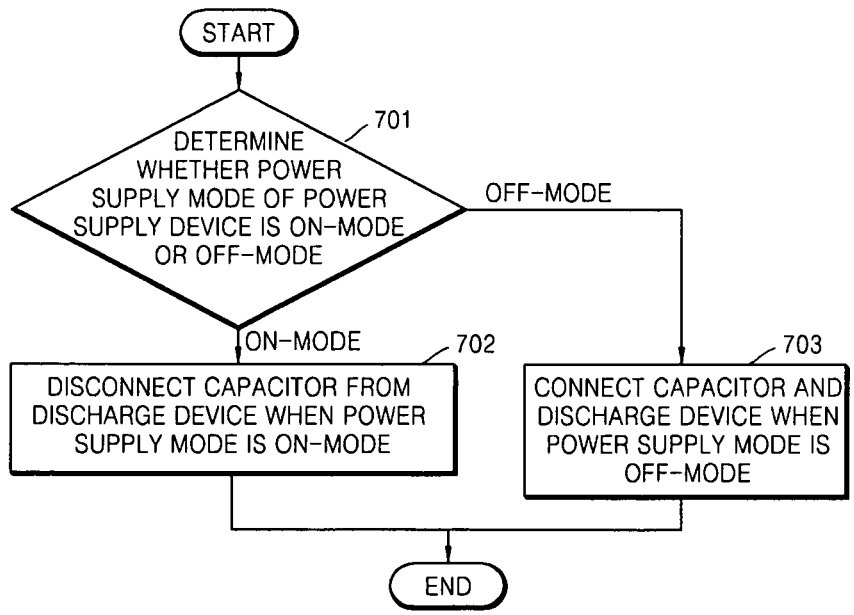

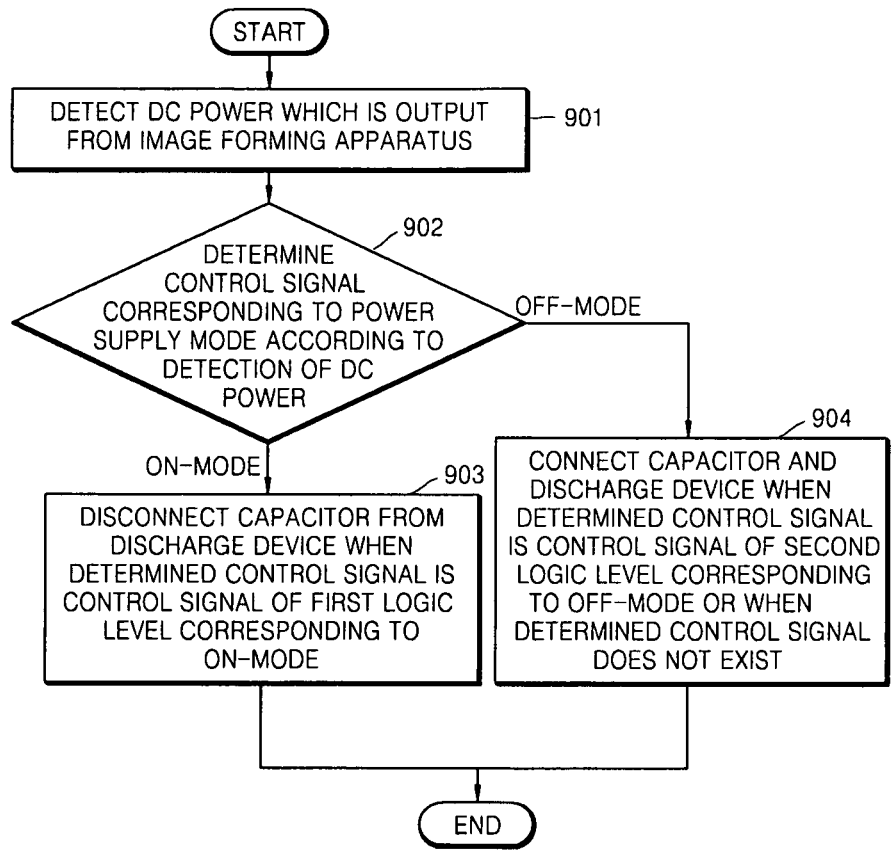
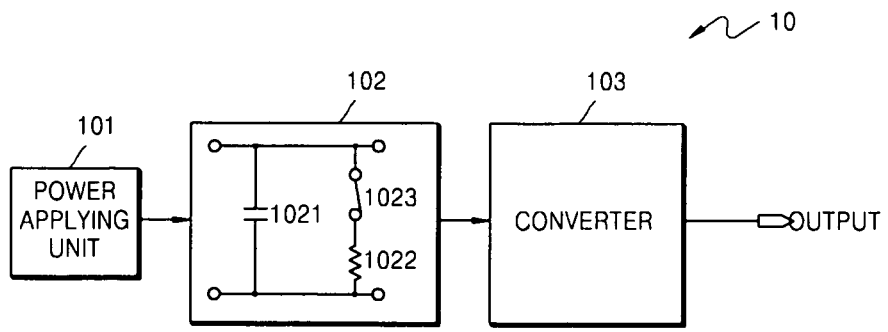

POWER SUPPLY DEVICE AND METHOD, BASED ON POWER SUPPLY MODE, FOR IMAGE FORMING APPARATUS

CROSS-REFERENCE TO RELATED APPLICATION

This application claims the benefit of Korean Patent Application No. 10-2009-0083150, filed on Sep. 3, 2009, in the Korean Intellectual Property Office, the disclosure of which is incorporated herein in its entirety by reference.

BACKGROUND

1. Field

The embodiments relate to a power supply device and method, and more particularly, to a power supply device and method of reducing power consumption in an image forming apparatus, in a standby mode or a normal operation mode, which are states in which power is supplied.

2. Description of the Related Art

Even if a user does not operate an electronic product, the product may be in a standby mode or a sleep mode. However, in such a mode, power is still supplied. Reducing power in a standby or a sleep mode has been promoted throughout the world as a means of saving energy. In particular, reducing the power consumed in standby mode is recently being raised as an essential feature to sell electronic products. Due to safety standards, which must be satisfied for power supply devices, power supply devices necessarily require an electromagnetic interference (EMI) filter. However, since a voltage that accumulates in such an EMI filter may harm a user in a power-off state, the EMI filter must to be discharged.

SUMMARY

Accordingly, it is an aspect of the present invention to provide a power supply device and a method for an image forming apparatus, which can change the connection state of a discharge device to discharge an electromagnetic interference (EMI) filter and a capacitor included in the EMI filter, so that power consumed in a standby mode or a normal operation mode which is a state where power is supplied, is reduced.

Additional aspects and/or advantages will be set forth in part in the description which follows and, in part, will be apparent from the description, or may be learned by practice of the invention.

The foregoing and/or other aspects are achieved by providing a power supply device for an image forming apparatus, the power supply device including: an alternating current (AC) power source; a filter unit filtering alternating current AC power from the AC power source; and a converter generating direct current (DC) power from the filtered AC power, wherein the filter unit includes: a capacitor connected to the AC power source; a discharge device connected to the capacitor and discharging electric charges accumulated in the capacitor; and a switching device switching connection between the capacitor and the discharge device according to a power supply mode of the power supply device.

The foregoing and/or other aspects are achieved by providing a power supply method for an image forming apparatus, the method including: determining a power supply mode of a power supply device for an image forming apparatus; and switching connection between a capacitor and a discharge device, the capacitor being connected to an alternating current (AC) power source according to the determined power supply mode and a discharge device discharging electric charges accumulated in the capacitor.

The foregoing and/or other aspects are achieved by providing a power supply device including: a first power source; a filter unit filtering a first power supplied from the first power source; and a converter generating a second power from the filtered first power, wherein the filter unit includes: a capacitor connected to the first power source, a discharge device connected to the capacitor and discharging electric charges accumulated in the capacitor, and a switching device switching connection between the capacitor and the discharge device according to a power supply mode of the power supply device, wherein the power supply device outputs the generated second power.

BRIEF DESCRIPTION OF THE DRAWINGS

The above and other features and advantages will become more apparent by describing in detail exemplary embodiments thereof with reference to the attached drawings in which:

FIG. 6 is a flowchart of a power supply method for an image forming apparatus for reducing standby power, according to an exemplary embodiment;

FIG. 7 is a detailed flowchart of a power supply method for reducing standby power, according to an exemplary embodiment;

FIG. 9 is a detailed flowchart of a power supply method for reducing standby power, according to another exemplary embodiment; and FIG. 10 is a block diagram of a power supply device, according to an exemplary embodiment.

DETAILED DESCRIPTION

Figure 1:
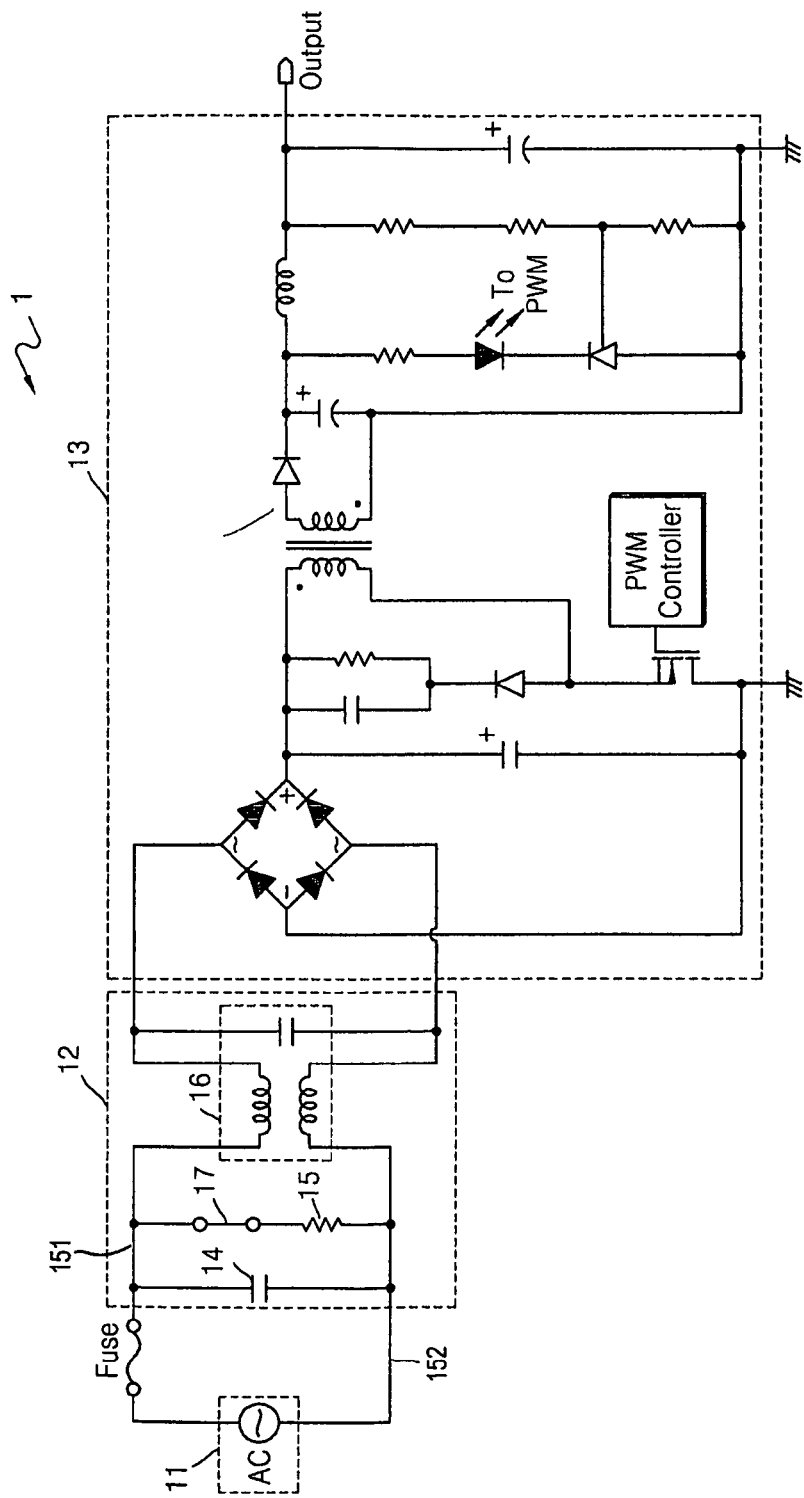
FIG. 1 is a circuit diagram explaining a power supply device for an image forming apparatus according to an exemplary embodiment.

Reference will now be made in detail to the embodiments, examples of which are illustrated in the accompanying drawings, wherein like reference numerals refer to the like elements throughout. The embodiments are described below by referring to the figures.

FIG. 1 is a circuit diagram explaining a power supply device 1 for an image forming apparatus, according to an exemplary embodiment. Referring to FIG. 1, the power supply device 1 includes an alternating current (AC) power source 11, a filter unit 12, and a converter 13. The filter unit 12 includes a capacitor 14, a discharge device 15, a line filter 16, and a switching device 17. One of ordinary skill in the art would understand that the power supply device 1 according to the current embodiment may include not only the aforementioned components, but also other general components.

In general, apparatuses, for example, a monitor, a communication terminal, an image forming apparatus such as a computer, a printer, a copier, or the like, need a power supply device that has a simple structure, is small, and can supply stable power. The power supply device provides power required to operate electronic products such as an image forming apparatus, a computer, or the like, and generates output power from input power. The power supply device mainly uses a switching mode power supply (SMPS) device.

The SMPS device provides a stable output voltage by controlling a switch formed of a semiconductor device such as a metal-oxide-semiconductor field-effect transistor (MOSFET). The SMPS device includes a buck type, a boost type, a buck-boost type, a flyback type, a forward type, a push-pull type, etc. Internal circuit components of the converter 13 are not limited to those illustrated in FIG. 1 and may be changed easily according to the type of the SMPS device.

Details of the power supply device 1 of FIG. 1 will now be described.

The AC power source 11 applies an AC voltage to the power supply device 1. The AC power source 11 is a general power source generating an AC voltage having a size and a direction varying periodically with time. A domestic distribution voltage is used by providing an AC voltage of 220V and 60 Hz as a standard voltage. However, one of ordinary skill in the art would understand that the embodiment is not limited by this domestic distribution voltage.

The filter unit 12 filters AC current or an AC voltage applied from the AC power source 11. In other words, the filter unit 12 filters noise such as electromagnetic interference (EMI) generated in the AC power source 11. Therefore, the filter unit 12 corresponds to an EMI filter that removes EMI of the power supply device 1. EMI may be generated while the SMPS device is applying power to electronic products such as a computer, an image forming apparatus, or the like. EMI is an electromagnetic noise in which electromagnetic waves generated incidentally from an electronic product affect the operation of the electronic product or another electronic instrument. Accordingly, the power supply device 1 uses the EMI filter in order to reduce EMI, and the EMI filter includes an X-capacitor, a Y-capacitor, a line filter, etc.

The filter unit 12 includes the capacitor 14 connected to the AC power source 11, the discharge device 15 connected to the capacitor 14 and discharging electric charges accumulated in the capacitor 14, and the switching device 17 switching connection between the capacitor 14 and the discharge device 15 according to a power supply mode. The capacitor 14 connected in parallel with the AC power source 11 in the power supply device 1 is connected between a line 151 and a line 152 to correspond to the X-capacitor to remove EMI. The capacitor 14 corresponding to the X capacitor removes the EMI by preventing rapid changes of the AC voltage due to noise generated by EMI.

In detail, the X-capacitor, which is the capacitor 14 additionally connected between the line 151 and the line 152, removes noise such as electromagnetic waves existing between the line 151 and the line 152. Although not shown in FIG. 1, a Y-capacitor, which is a capacitor additionally connected between the line 151 and ground, removes noise such as electromagnetic waves existing between the line 151 and ground. That is, the X-capacitor and the Y-capacitor have the same functions for removing noise such as electromagnetic waves, but they are differentiated according to the connection type.

The line filter 16 removes EMI in a rectifier or a SMPS device and is located at the anterior end of a product to reduce noise such as electromagnetic waves generated from the product. In general, the line filter 16 basically includes a coil and a capacitor.

The capacitor 14 of the filter unit 12 accumulates electric charges of the AC power source 11 when the AC power source 11 is connected and then disconnected. As such, although the AC power source 11 is disconnected, the charged voltage remains as it is. Thus, a user may get an electric shock which may be harmful to the user. Accordingly, in order to discharge the accumulated electric charges, a discharge device 15 discharging the accumulated electric charges in the capacitor 14 is connected in parallel with the capacitor 14. The discharge device 15 has resistance. In the current embodiment, the discharge device 15 including a resistance element (i.e., a resistor) has been described as an example, but the embodiment is not limited thereto.

The switching device 17 switching connection between the capacitor 14 and the discharge device 15 is connected in series with the discharge device 15. The reason that the switching device 17 is connected in series with the discharge device 15 is as follows.

The discharge device 15 consumes power according to its resistance value, and the consumed power may be calculated by using Equations 1-3 below, $$V = U \cdot e^{-t/RC}$$

Wherein, U denotes a peak voltage between the lines to which the discharge device 15 is connected, R denotes a resistance value of the discharge device 15, and C denotes capacitance between the lines to which the capacitor 14 is connected. When Equation 1 is rewritten with respect to the resistance value R, Equation 2 below is obtained.

$$R = \frac{1}{C(\ln U - \ln V)} \quad (2)$$

Wherein, according to the value of capacitance C, the resistance value R has a resistance value between about 500 kΩ and about 2 kΩ generally.

Here, assuming that a voltage of 220 V is input to the power supply device 1 and a resistance value of the discharge device 15 is 500 kΩ, power consumed in the discharge device 15 may be obtained by using Equation 3 below.

$$P_{loss} = \frac{V^2}{R} = \frac{220^2}{500000} = 0.0968 \text{ W} \quad (3)$$

Wherein, assuming that a voltage of 220 V is input to the power supply device 1 and a resistance value of the discharge device 15 is 500 kΩ, power of 0.0968 W is consumed in the discharge device 15.

Recently, as energy saving has become an important issue, reducing standby power consumption in the power supply device 1 has become essential. Accordingly, electronic products consuming standby power of less than 1 W are now being sold. However, in order to reduce energy consumption, a system enhancing a standard of standby power consumption to less than 0.6 W is being promoted. Accordingly, when a voltage of 220 V is input to the power supply device 1 and a resistance value of the discharge device 15 is 500 kΩ, power of 0.0968 W consumed in the discharge device 15 is a value corresponding to about 10% of 1 W, which is the current standby power standard. Also, power of 0.0968 W is a value corresponding to about 17% of 0.6 W, which is a standby power standard that is to be promoted. Thus, in order to reduce unnecessary standby power consumption in a standby mode or normal operation-mode, power consumption in the discharge device 15 must be reduced. That is, when power is supplied as in the standby mode or normal operation-mode, connection of the discharge device 15 needs to be cut off so as not to discharge electric charges accumulated in the capacitor 14, so that the standby power is not consumed in the discharge device 15.

The switching device 17, connected in series with the discharge device 15, switches connection between the capacitor 14 and the discharge device 15 according to a power supply mode of the power supply device 1. When the switching device 17 is turned-off, the discharge device 15 is disconnected from the capacitor 14, thereby not discharging the electric charges accumulated in the capacitor 14, and thus the discharge device 15 does not consume standby power. However, when the switching device 17 is turned-on, the discharge device 15 is connected with the capacitor 14, thereby discharging the electric charges accumulated in the capacitor 14, and thus the discharge device 15 consumes standby power. Accordingly, as described in the above equations, the standby power consumption in the discharge device 15 may be controlled.

In detail, the switching device 17 uses a normally closed contact relay which is turned off when power is supplied and turned on when power is not supplied. The normally closed contact relay maintains an on-state when power is not supplied. However, when power is supplied to apply current to the normally closed contact relay, magnetism is generated by a coil wound inside the normally closed contact relay, and thus the normally closed contact relay is physically turned-off. However, when power supply is stopped in a state where the normally closed contact relay is turned-off, magnetism disappears, thus the normally closed contact relay physically returns to an on-state.

A switching operation of the switching device 17 is determined according to a power supply mode of the power supply device 1. The power supply mode of the power supply device 1 illustrated in FIG. 1 may be an on-mode, which is a state where the AC power from the AC power source 11 is applied, or an off-mode, which is a state where the AC power from the AC power source 11 is not applied. That is, the on-mode is a state where a user turns on a power switch, and the off-mode is a state where the user turns off the power switch. Accordingly, the switching device 17 disconnects the capacitor 14 and the discharge device 15 when the power supply mode is an on-mode, and connects the capacitor 14 and the discharge device 15 when the power supply mode is an off-mode. That is, current is applied to the coil wound inside the normally closed contact relay in an on-mode, and thus the normally closed contact relay is turned-off, thereby disconnecting the capacitor 14 and the discharge device 15. However, current is not applied to the normally closed contact relay in an off-mode, and thus the normally closed contact relay is turned-on, thereby connecting the capacitor 14 and the discharge device 15.

Next, other components of FIG. 1 will now be described.

The converter 13 generates DC power from the AC power, from which noise such as EMI is filtered, in the filter unit 12. The converter 13 includes a rectifier circuit, a smoothing circuit, a transformer, a semiconductor switch, a pulse-width modulation (PWM) controlling unit, an LC filter which is a second order lowpass filter, etc.

The rectifier circuit rectifies an AC voltage applied from the AC power source 11. In general, the rectifier circuit uses a bridge diode rectifier circuit. The bridge diode rectifier circuit full-wave rectifies the AC voltage from which the EMI is removed in the filter unit 12 by using four diodes. The rectifier circuit according to the embodiment may use such a diode bridge, but the embodiments are not limited thereto. The smoothing circuit includes a capacitor, etc. and smoothens the full-wave rectified AC voltage into a DC voltage. Primary and secondary sides of the transformer are respectively wound with coils having different turn ratios. The smoothed DC voltage is boosted or decompressed to a DC voltage having a predetermined level according to the turn ratio of the coil wound on the primary and secondary sides of the transformer. For example, since a DC voltage, for example, +5 V, +12 V, or the like is used in an image forming apparatus, the turn ratio of the coil wound on the transformer is determined according to the DC voltage. The DC voltage, which has passed through the transformer and has been output from the secondary side of the transformer, passes through the rectifier circuit and is output to outside of the power supply device, and then is provided as a power source of an electronic product.

Furthermore, since the power supply device 1 according to the embodiment corresponds to a SMPS device, a semiconductor switch and a PWM controlling unit are included in the converter 13. The semiconductor switch may be a MOSFET semiconductor switch, or the like. The PWM controlling unit controls a switching operation of the semiconductor switch. That is, the PWM controlling unit controls a ratio between an on-time and an off-time of the semiconductor switch, which is called pulse-width modulation (PWM). The PWM controlling unit monitors the DC voltage which is output from the converter 13 and compares the DC voltage with a stable standard voltage. When the output voltage is changed, the PWM controlling unit controls the semiconductor switch so as to maintain and stabilize the DC voltage.

The converter 13 according to the embodiment includes a general circuit which generates and outputs DC power from the AC power, from which noise such as EMI is filtered, in the SMPS device. The internal circuit structure of the converter 13 is not limited thereto, and one of ordinary skill in the art could change the converter 13, which outputs a DC voltage.

A fuse is a general device automatically cutting off current so that current above a predetermined value cannot be applied, to the power supply device 1. When too much current is applied to the power supply device 1, the fuse melts and is cut due to heat generated by the current.

Figure 2:
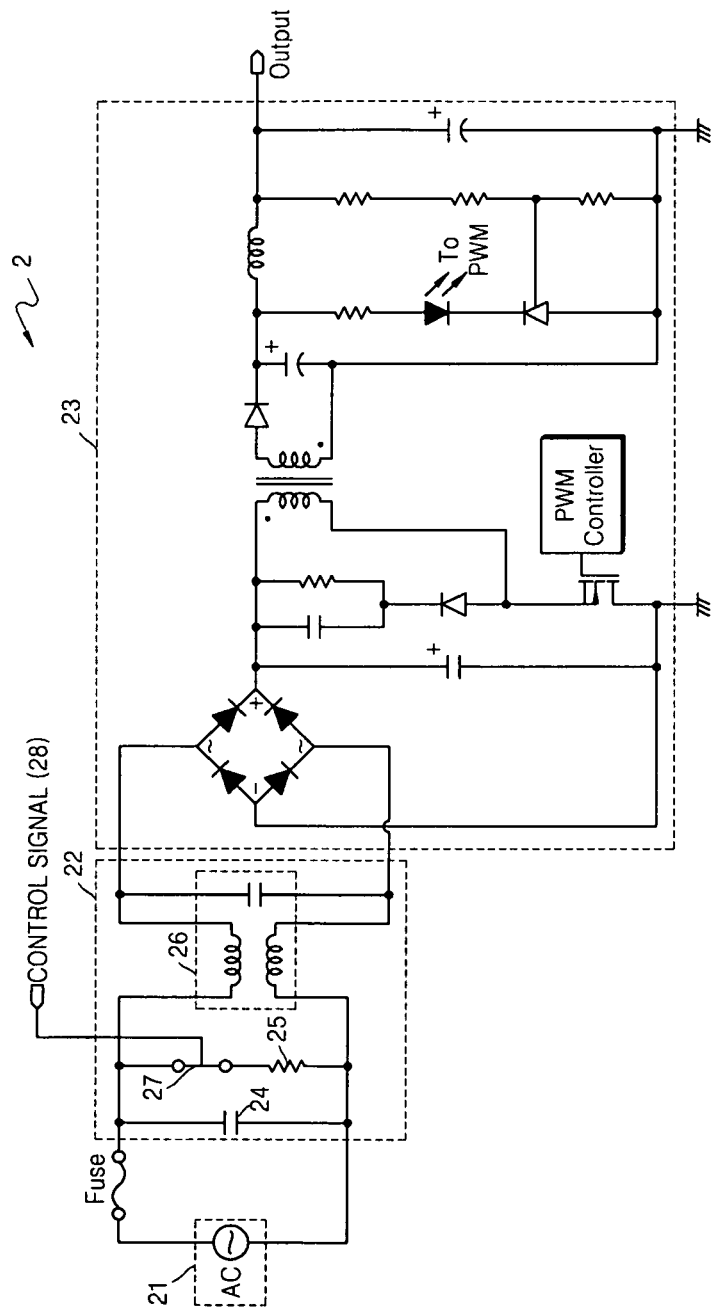
FIG. 2 is a circuit diagram explaining a power supply device, according to another exemplary embodiment.

FIG. 2 is a circuit diagram for explaining a power supply device 2, according to another exemplary embodiment. Referring to FIG. 2, the power supply device 2 includes an AC power source 21, a filter unit 22, and a converter 23. The filter unit 22 includes a capacitor 24, a discharge device 25, a line filter 26, and a switching device 27. One of ordinary skill in the art would understand that the power supply device 2 according to the embodiment of FIG. 2 may include not only the aforementioned components, but also other general components.

The AC power source 21, the capacitor 24, the discharge device 25, the line filter 26, and the converter 23 are the same as those illustrated in FIG. 1, and thus a detailed description thereof will be omitted here.

The switching device 27 connected in series with the discharge device 25 switches connection between the capacitor 24 and the discharge device 25 according to a power supply mode of the power supply device 2. When the switching device 27 is turned-off, the discharge device 25 is disconnected from the capacitor 24, thereby not discharging electric charges accumulated in the capacitor 24, and thus the discharge device 25 does not consume standby power. However, when the switching device 27 is turned-on, the discharge device 25 is connected to the capacitor 24, thereby discharging electric charges accumulated in the capacitor 24, and thus the discharge device 25 consumes standby power. Accordingly, as described in the above equations, the standby power consumption in the discharge device 15 may be controlled.

The switching device 27 receives a control signal 28 corresponding to a power supply mode from an external circuit connected to the power supply device 2, and switches connection between the capacitor 24 and the discharge device 25 according to the received control signal 28. Here, the power supply mode may be a standby mode or a normal operation mode, which are states where the AC power from the AC power source 21 is applied, or an off-mode which is a state where the AC power from the AC power source 21 is not applied. The standby mode is a standby state where a user does not operate an electronic product but a power source is connected. That is, the standby mode is set up so that an electronic product consumes minimum power, and involves a case where a very small amount of load is applied to an output stage of an output circuit. The normal operation mode refers to state where a user is operating an electronic product. The off-mode refers to a state where a user turned-off a power source of an electronic product or where an electronic product is not normally operated.

The external circuit, which sends the control signal 28 to the switching device 27, is a main board formed inside an electronic product, such as an image forming apparatus, a computer, or the like, in which the power supply device 2 is installed. That is, the control signal 28 is generated in a CPU mounted on the main board, a control circuit, or the like and the generated control signal 28 is sent to the switching device 27 via a cable connecting the main board and the power supply device 2. The main board sends the control signal 28 according to the power supply mode of the power supply device 2 to the switching device 27. That is, the control signal 28 in a standby mode or a normal operation mode and the control signal 28 in an off-mode are different from each other, because the discharge device 25 and the capacitor 24 need to be disconnected in the standby mode or the normal operation mode and need to be connected in the off-mode.

In detail, the switching device 27 performs a switching operation according to the control signal 28. The switching device 27 uses a normally closed contact relay which is turned off when the control signal 28 is a high logic level signal and turned on when the control signal 28 is a low logic level signal or when the control signal 28 does not exist.

Hereinafter, for convenience of description, a case where the switching device 27 is turned off when the control signal 28 is a high logic level signal and turned on when the control signal 28 is a low logic level signal will be described. However, the switching device 27 may be turned off when the control signal 28 is a low logic level signal and turned on when the control signal 28 is a high logic level signal by connecting the switching device 27 to a PNP-type bipolar junction transistor (BJT), and this may be understood by one of ordinary skill in the art.

The difference between the switching device 17 of FIG. 1 and the switching device 27 of FIG. 2 will now be described.

The switching device 17 of FIG. 1 uses a normally closed contact relay which does not receive a control signal separately and performs a switching operation when power is supplied from a power source. On the other hand, the switching device 27 of FIG. 2 uses a normally closed contact relay which receives the control signal 28 and performs a switching operation according to the control signal 28.

The control signal 28 may be a high logic level signal or a low logic level signal. The high logic level signal corresponds to the standby mode or the normal operation mode. On the other hand, the low logic level signal corresponds to the off-mode. In general, a high logic level is a high pulse and a low logic level is a low pulse. One of ordinary skill in the art may understand that a user can set up which level is a high logic level and which level is a low logic level, according to the environment.

The switching device 27 disconnects the capacitor 24 from the discharge device 25 when the received control signal 28 is a high logic level signal, and connects the capacitor 24 and the discharge device 25 when the received control signal 28 does not exist. As such, the connection between the discharge resistance 25 and the capacitor 24 is cut off in a standby mode or a normal operation mode, so that power consumed unnecessarily in the discharge resistance 25 may be reduced.

Figure 3:
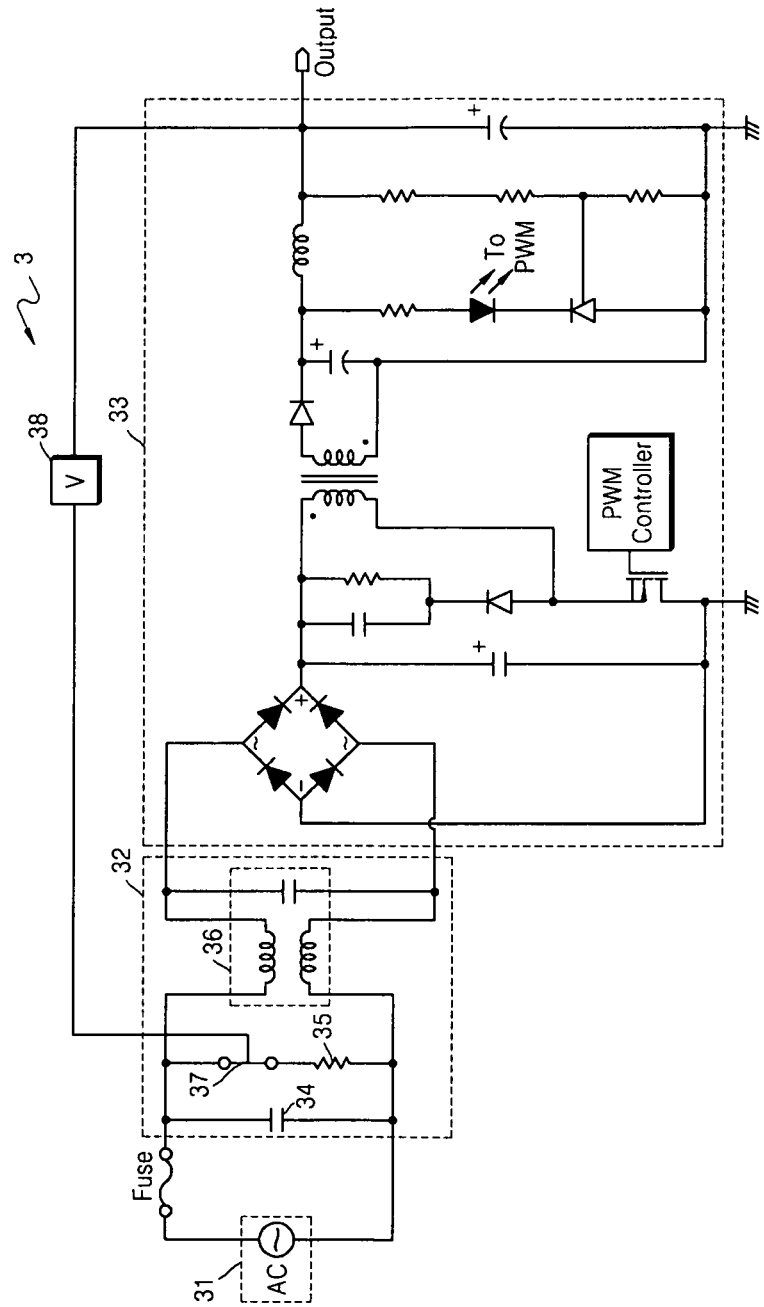
FIG. 3 is a circuit diagram explaining a power supply device, according to another exemplary embodiment.

FIG. 3 is a circuit diagram for explaining about a power supply device 3, according to another exemplary embodiment. Referring to FIG. 3, the power supply device 3 includes an AC power source 31, a filter unit 32, a converter 33, and a voltage detecting unit 38. The filter unit 32 includes a capacitor 34, a discharge device 35, a line filter 36, and a switching device 37. One of ordinary skill in the art would understand that the power supply device 3 according to the current embodiment may include not only the aforementioned components, but also other general components.

The voltage detecting unit 38 detects output of DC power which is output from the converter 33 and sends a control signal to the switching device 37. The AC power source 31, the capacitor 34, the discharge device 35, the line filter 36, and the converter 33 illustrated in FIG. 3, except for the switching device 37 and the voltage detecting unit 38, are the same as those illustrated in FIG. 2, and thus a detailed description thereof will be omitted.

The switching device 37 connected in series with the discharge device 35 switches connection between the capacitor 34 and the discharge device 35 according to a power supply mode of the power supply device 3. The switching device 37 receives a control signal corresponding to the power supply mode from the voltage detecting unit 38 and switches connection between the capacitor 34 and the discharge device 35 according to the received control signal. Here, the power supply mode may be an on-mode which is a state where the DC power, output from the voltage detecting unit 38, is detected, or an off-mode which is a state where the DC power, output from the voltage detecting unit 38, is not detected. The switching device 37 receives a control signal corresponding to the power supply mode and switches connection between the capacitor 34 and the discharge device 35 according to the received control signal.

In detail, the switching device 37 performs a switching operation according to the control signal. The switching device 37 uses a normally closed contact relay which may be turned off when the control signal is a high logic level signal or alternatively may be turned off when the control signal is a low logic level signal or when the control signal does not exist. Hereinafter, for convenience of description, a case where the switching device 37 is turned off when the control signal is a high logic level signal and turned on when the control signal is a low logic level signal will be described. However, the switching device 37 may instead be turned off when the control signal is a low logic level signal and turned on when the control signal is a high logic level signal by connecting the switching device 37 to a PNP type BJT, and this may be understood by one of ordinary skill in the art.

The difference between the switching device 17 of FIG. 1 and the switching device 37 of FIG. 3 will now be described.

The switching device 17 of FIG. 1 uses a normally closed contact relay which does not receive a control signal separately and performs a switching operation when power is supplied. On the other hand, the switching device 37 of FIG. 3 uses a normally closed contact relay which receives the control signal and performs a switching operation according to the control signal.

Also, the difference between the switching device 27 of FIG. 2 and the switching device 37 of FIG. 3 will now be described.

The switching device 27 of FIG. 2 receives the control signal 28 generated from an external circuit, such as a main board of an image forming apparatus, a computer, or the like, to perform a switching operation according to the control signal 28. On the other hand, the switching device 37 of FIG. 3 receives a control signal according to an output voltage detected in the voltage detecting unit 38 formed in the power supply device 3 to perform a switching operation according to the control signal. That is, the switching device 37 of FIG. 3 does not receive the control signal from the external circuit, and thus, does not require a cable for receiving the control signal from the external circuit.

The control signal may be a high logic level signal or a low logic level signal. The high logic level signal is a signal corresponding to an on-mode, and the low logic level signal is a signal corresponding to an off-mode. In general, a high logic level is a high pulse, and a low logic level is a low pulse. One of ordinary skill in the art may understand that a user can set in accordance with the environment which level is a high logic level and which is a low logic level.

The switching device 37 disconnects the capacitor 34 and the discharge device 35 when the received control signal 38 is the high logic level signal, and connects the capacitor 34 and the discharge device 35 when the received control signal is the low logic level signal or when the received control signal does not exist. As such, the switching device 37 disconnects connection between the discharge device 35 and the capacitor 34 in an on-mode, so that power consumed unnecessarily in the discharge device 35 may be reduced.

Figure 4:
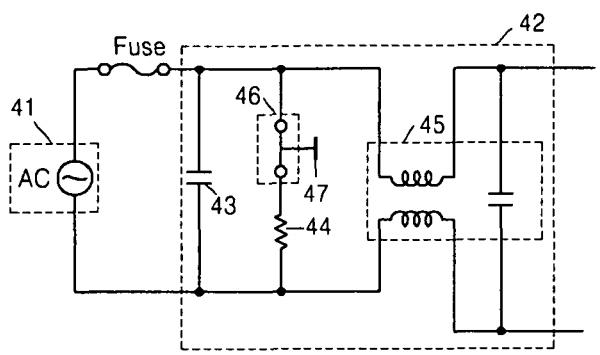
FIG. 4 is a circuit diagram of an AC power source and a filter unit of a power supply device, according to an exemplary embodiment.

FIG. 4 is a circuit diagram of an AC power source and a filter unit of a power supply device, according to an exemplary embodiment. Referring to FIG. 4, a filter unit 42 includes an AC power source 41, a capacitor 43, a discharge device 44, a line filter 45, and a switching device 46. The switching device 46 is a normally closed contact relay which is turned on or turned off according to a control signal 47. The control signal 47 may be, for example, from an external circuit or a voltage detecting unit. The capacitor 43 corresponds to an X-capacitor connected in parallel with the AC power source 41, and the filter unit 42 corresponds to an EMI filter. The switching device 46 and the discharge device 44 connected in parallel with each other are connected to the AC power source 41 and the capacitor 43. The discharge device 44 is connected in series to one end of the switching device 46.

Figure 5:
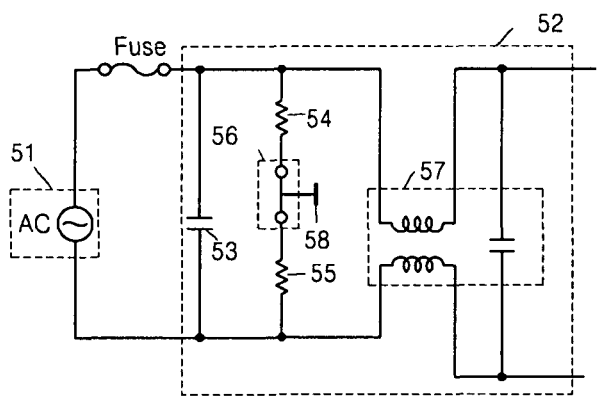
FIG. 5 is a circuit diagram of an AC power source and a filter unit of a power supply device, according to another exemplary embodiment.

FIG. 5 is a circuit diagram of an AC power source and a filter unit of a power supply device, according to another exemplary embodiment. Referring to FIG. 5, a filter unit 52 includes an AC power source 51, a capacitor 53, discharge devices 54 and 55, a switching device 56, and a line filter 57. The switching device 56 is a normally closed contact relay which is turned on or turned off according to a control signal 58. The control signal 58 may be, for example, from an external circuit or a voltage detecting unit.

The switching device 46 of FIG. 4 is connected in series to one end of the discharge device 44, but the switching device 56 of FIG. 5 is connected in series between the discharge devices 54 and 55.

FIG. 6 is a flowchart of a power supply method for an image forming apparatus for reducing standby power, according to an exemplary embodiment. The power supply method according to the embodiment of FIG. 6 includes processes which are processed sequentially in the power supply device 1 of FIG. 1. Accordingly, although it is omitted below, the above description regarding the power supply device 1 may be applied to the power supply method according to the current embodiment.

In Operation 601, the switching device determines a power supply mode of the power supply device. Here, the power supply mode may be an on-mode, which is a state where AC power is supplied, or an off-mode, which is a state where AC power is not supplied. A power supply mode according to another embodiment may be a standby mode or a normal operation mode, which are states where AC power is supplied, or an off-mode, which is a state where AC power source is not supplied. A power supply mode according to still another embodiment may be an on-mode which is a state where DC power, output from a voltage detecting unit, is detected, or an off-mode which is a state where the DC power, output from the voltage detecting unit, is not detected.

In Operation 602, the switching device switches connection between a capacitor, connected to an AC power source, and a discharge device discharging electric charges accumulated in the capacitor according to the determined power supply mode.

FIG. 7 is a detailed flowchart of a power supply method for reducing standby power, according to another exemplary embodiment.

In Operation 701, a switching device determines whether a power supply mode of a power supply device for an image forming apparatus is an on-mode or an off-mode. Here, the on-mode is a state where AC power is supplied, and the off-mode is a state where AC power is not supplied.

In Operation 702, the switching device disconnects a capacitor from a discharge device when the power supply mode is the on-mode. That is, the discharge device does not discharge electric charges accumulated in the capacitor, and thus a discharge device does not consume power.

In Operation 703, the switching device connects the capacitor and the discharge device when the power supply mode is the off-mode. That is, the discharge device discharges electric charges accumulated in the capacitor in the off-mode.

Figure 8:
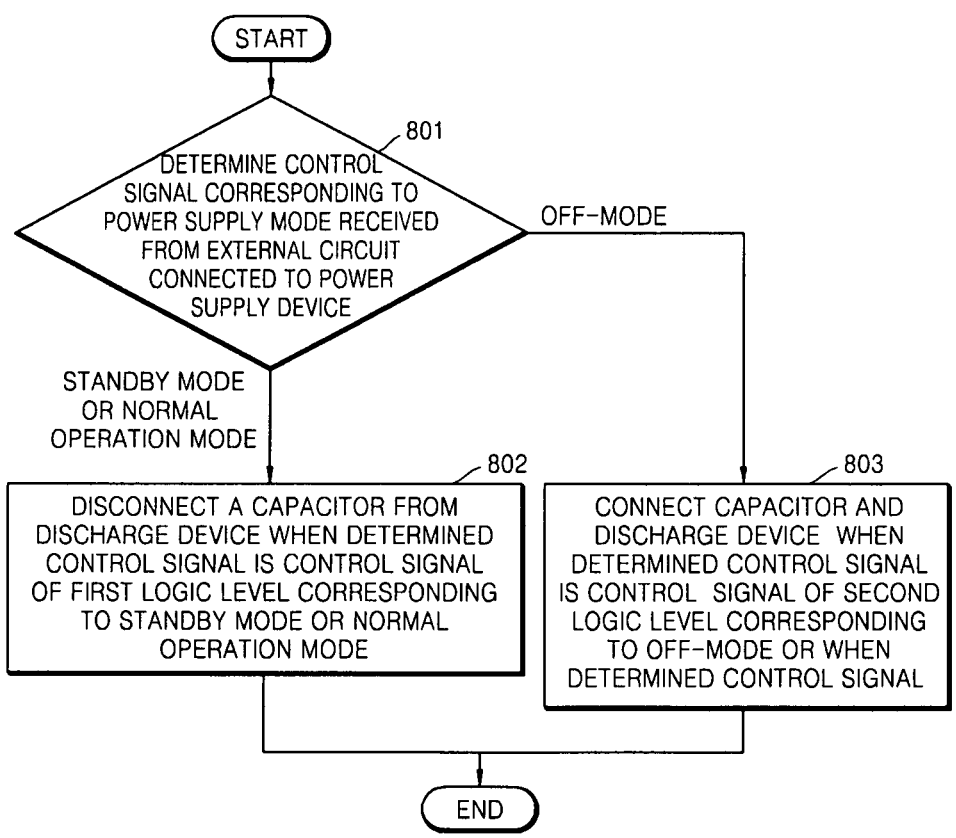
FIG. 8 is a detailed flowchart of a power supply method for reducing standby power, according to another exemplary embodiment.

FIG. 8 is a detailed flowchart of a power supply method for reducing standby power, according to another exemplary embodiment.

In Operation 801, a switching device determines a control signal corresponding to a power supply mode received from an external circuit connected to a power supply device for an image forming apparatus. Here, the power supply mode may be a standby mode or a normal operation mode, which is a state where AC power is supplied, and an off-mode, which is a state where AC power source is not supplied.

In Operation 802, the switching device disconnects a capacitor from a discharge device when the determined control signal is a control signal of a first logic level corresponding to the standby mode or the normal operation mode. That is, the discharge device does not discharge electric charges accumulated in the capacitor in the standby mode or the normal operation mode, and thus a discharge device does not consume power.

In Operation 803, the switching device connects the capacitor and the discharge device when the determined control signal is a control signal of a second logic level corresponding to the off-mode or when the determined control signal does not exist. That is, the discharge device discharges electric charges accumulated in the capacitor in the off-mode.

FIG. 9 is a detailed flowchart of a power supply method for reducing standby power, according to another exemplary embodiment.

In Operation 901, a voltage detecting unit detects DC power which is output from the image forming apparatus. A power supply mode may be an on-mode which is a state where the DC power, output from the voltage detecting unit, is detected or an off-mode which is a state where the DC power is not detected.

In Operation 902, a switching device determines a control signal corresponding to the power supply mode according to the detection of the DC power.

In Operation 903, the switching device disconnects a capacitor from a discharge device when the determined control signal is a control signal of a first logic level corresponding to the on-mode. That is, the discharge device does not discharge electric charges accumulated in the capacitor in a standby mode or a normal operation mode, and thus a discharge device does not consume power.

In Operation 904, the switching device connects the capacitor and the discharge device when the determined control signal is a control signal of a second logic level corresponding to the off-mode or when the determined control signal does not exist.

FIG. 10 is a block diagram of a power supply device, according to an exemplary embodiment. Referring to FIG. 10, a power supply device 10 includes a power applying unit 101, a filter unit 102, and a converter 103. The filter unit 102 of the power supply device 1 of FIG. 1 corresponds to an EMI filter. The EMI filter is used in a power supply device of an electronic product such as a personal computer, a TV, or the like, as well as in an image forming apparatus. That is, the power supply device of general electronic products corresponds to a SMPS device for removing EMI by using the EMI filter. Accordingly, the embodiment of FIG. 10 may be applied not only to the image forming apparatus, but also to other electronic products.

The power applying unit 101 applies AC power to the power supply device 10. The filter unit 102 filters the applied AC power, and the converter 103 generates DC power to be supplied to internal devices of an electronic product from the filtered AC power. The power supply device 10 outputs the generated DC power and supplies it to the internal devices of the electronic product. Components of the power supply device 10 operate in the same manner as those of the power supply device for an image forming apparatus 1 of FIG. 1. Accordingly, although it is omitted below, the above description regarding the power supply device 1 may be applied to the power supply device 10 according to the embodiment of FIG. 10.

Details about the filter unit 102 will now be described.

As described above, the filter unit 102 corresponds to the EMI filter. The filter unit 102 includes a capacitor 1021 connected to the power applying unit 101, a discharge device 1022 connected to the capacitor 1021 and discharging electric charges accumulated in the capacitor 1021, and a switching device 1023 switching connection between the capacitor 1021 and the discharge device 1022 according to a power supply mode of the power supply device 10.

According to characteristics of an electronic product, an embodiment of the power supply mode of the power supply device 10 may be an on-mode, which is a state where AC power is supplied, or an off-mode, which is a state where AC power source is not supplied. According to such a power supply mode, the switching device 1023 disconnects the capacitor 1021 from the discharge device 1022 when the power supply mode is the on-mode, and connects the capacitor 1021 and the discharge device 1022 when the power supply mode is the off-mode.

Also, according to characteristics of an electronic product, another embodiment of the power supply mode of the power supply device 10 may be a standby mode and a normal operation mode, which are states where AC power is supplied, or an off-mode, which is a state where AC power source is not supplied. According to such a power supply mode, the switching device 1023 receives a control signal corresponding to the power supply mode from an external circuit connected to the power supply device 10, and switches connection between the capacitor 1021 and the discharge device 1022 according to the received control signal.

Furthermore, according to characteristics of an electronic product, another embodiment of the power supply mode of the power supply device 10 is as follows. The power supply device 10 further includes a voltage detecting unit (not shown) which detects DC power, output from the converter 103, and sends a control signal to the switching device 1023 according to the power supply mode. The power supply mode may be an on-mode, which is a state where the DC power, output from the voltage detecting unit, is detected, or an off-mode, which is a state where the DC power is not detected. The switching device 1023 receives the control signal corresponding to the power supply mode, and switches connection between the capacitor and the discharge device according to the received control signal.

According to the embodiments, power, consumed in a standby mode or a normal operation mode, which are states where a power source is connected, can be reduced by changing the connection state of a discharge device discharging electric charges accumulated in an EMI filter and a capacitor of the EMI filter.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A power supply device comprising:
    a filter unit to filter alternating current (AC) power from an AC power source; and
    a converter to generate direct current (DC) power from the filtered AC power,
    wherein the filter unit comprises:
        a capacitor connected to the AC power source;
        a discharge device connected to the capacitor and discharging electric charges accumulated in the capacitor; and
        a switching device to switch a connection between the capacitor and the discharge device, according to a power supply mode of the power supply device, the power supply mode being determined based on a control signal output from a voltage detection unit that detects the DC power of a feedback signal from the converter,
    wherein the power supply mode comprises an on-mode including a standby mode or a normal operation mode, which are states where the DC power is detected, or an off-mode, which is a state where the DC power is not detected.

2. The power supply device of claim 1, wherein the switching device disconnects the capacitor from the discharge device when the power supply mode is the on-mode and connects the capacitor and the discharge device when the power supply mode is the off-mode.

3. The power supply device of claim 2, wherein the switching device is a normally closed contact relay which is turned-off when AC power is supplied and turned-on when the AC power is not supplied.

4. The power supply device of claim 1, wherein the switching device disconnects the capacitor from the discharge device when the received control signal is the first logic level signal, and connects the capacitor and the discharge device when the received control signal is the second logic level signal or when the control signal is not received.

5. The power supply device of claim 1, wherein the switching device performs a switching operation according to the control signal, and comprises a normally closed contact relay which is turned-off when the control signal is a first logic level signal and turned-on when the control signal is a second logic level signal or when the control signal is not received.

6. The power supply device of claim 1, wherein the filter unit is an electromagnetic interference (EMI) filter removing EMI of the AC power.

7. The power supply device of claim 1, wherein the power supply device is a switching mode power supply (SMPS) device.

8. The power supply device of claim 1, wherein the switching device is connected in series to one end of the discharge device.

9. The power supply device of claim 1, further comprising a plurality of the discharge devices, the switching device being connected in series between the discharge devices.

10. The power supply device of claim 1, wherein the discharge device is a resistor.

11. A power supply device comprising:
a filter unit to filter alternating current (AC) power from an AC power source;
a converter to generate direct current (DC) power from the filtered AC power,
wherein the filter unit comprises:
a capacitor connected to the AC power source;
a discharge device connected to the capacitor and discharging electric charges accumulated in the capacitor; and
a switching device to switch a connection between the capacitor and the discharge device, according to a power supply mode of the power supply device, the power supply mode being determined based on at least one of a feedback signal from the converter and a control signal from an external circuit connected to the power supply device,
wherein the power supply mode comprises an on-mode including a standby mode or a normal operation mode, which are states where the AC power is supplied, or an off-mode, which is a state where the AC power is not supplied, and
a voltage detecting unit detecting the DC power, which is output from the converter, and sending a control signal to the switching device, wherein the o-n mode is a state where the DC power is detected, and the off-mode is a state where the DC power is not detected, and the switching device receives the control signal corresponding to the power supply mode and switches connection between the capacitor and the discharge device according to the received control signal.

12. The power supply device of claim 11, wherein the control signal comprises a first logic level signal corresponding to the on-mode or a second logic level signal corresponding to the off-mode, and the switching device disconnects the capacitor from the discharge device when the received control signal is the first logic level signal and connects the capacitor and the discharge device when the received control signal is the second logic level signal or when the control signal is not received.

13. The power supply device of claim 11, wherein the switching device performs a switching operation according to the control signal, and comprises a normally closed contact relay which is turned off when the control signal is a first logic level signal and turned-on when the control signal is a second logic level signal or when the control signal is not received.

14. A power supply method comprising:
determining a power supply mode of a power supply device for the image forming apparatus, based on a control signal output from a voltage detection unit detecting DC power of a feedback signal from the converter; and
switching connection between a capacitor and a discharge device, the capacitor being connected to an alternating current (AC) power source according to the determined power supply mode and the discharge device discharging electric charges accumulated in the capacitor,
wherein the power supply mode comprises an on-mode including a standby mode or a normal operation mode, which are states where the DC power is detected, or an off-mode, which is a state where the DC power is not detected.

15. The method of claim 14, wherein the determining of the power supply mode comprises:
determining whether the control signal corresponding to the power supply mode is received from the external circuit connected to the power supply device, and
wherein the switching of the connection between the capacitor and the discharge device comprises disconnecting the capacitor from the discharge device when the determined control signal is a first logic level signal corresponding to the standby mode or the normal operation mode, and connecting the capacitor and the discharge device when the determined control signal is a second logic level signal corresponding to the off-mode, or determined that the control signal is not received.

16. The method of claim 14, wherein the switching the connection between the capacitor and the discharge device comprises disconnecting the capacitor from the discharge device when the power supply mode is the on-mode, and connecting the capacitor and the discharge device when the power supply mode is the off-mode.

17. A power supply device comprising:
a filter unit to filter a first power supplied from a first power source; and
a converter to generate a second power from the filtered first power, wherein the filter unit comprises:
a capacitor connected to the first power source;
a discharge device connected to the capacitor and discharging electric charges accumulated in the capacitor; and
a switching device to switch a connection between the capacitor and the discharge device, according to a power supply mode of the power supply device, the power supply mode being determined based on a control signal output from a voltage detection unit detecting DC power of a feedback signal from the converter,
wherein the power supply mode includes a standby mode or a normal operation mode, which are states where the first power source is supplied and the DC power is detected, or an off-mode, which is a state where the first power source is not supplied and the DC power is not detected, wherein the power supply device outputs the generated second power.

18. The power supply device of claim 17, wherein the switching device disconnects the capacitor from the discharge device when the power supply mode is the on-mode and connects the capacitor and the discharge device when the power supply mode is the off-mode.

19. The power supply device of claim 18, wherein the switching device receives the control signal, and disconnects the capacitor from the discharge device when the received control signal is a first logic level signal, and connects the capacitor and the discharge device when the received control signal is a second logic level signal or when the control signal is not received.

20. The power supply device of claim 17, wherein the switching device receives the control signal, and disconnects the capacitor from the discharge device when the received control signal is a first logic level signal, and connects the capacitor and the discharge device when the received control signal is a second logic level or when the control signal is not received.

21. A power supply device comprising:
a filter unit to filter a first power supplied from a first power source;
a converter to generate a second power from the filtered first power, wherein the filter unit comprises:
a capacitor connected to the first power source;
a discharge device connected to the capacitor and discharging electric charges accumulated in the capacitor; and
a switching device to switch a connection between the capacitor and the discharge device, according to a power supply mode of the power supply device, the power supply mode being determined based on at least one of a feedback signal from the converter and a control signal from an external circuit connected to the power supply device,
wherein the power supply mode includes a standby mode or a normal operation mode, which are states where the first power source is supplied, or an off-mode, which is a state where the first power source is not supplied,
wherein the power supply device outputs the generated second power, and a voltage detecting unit detecting the second power, output from the converter, and sending a control signal to the switching device,
wherein the on-mode is a state where the second power is detected, and the off-mode is a state where the second power is not detected, and the switching device receives the control signal corresponding to the power supply mode and switches connection between the capacitor and the discharge device according to the received control signal.

22. A power supply method for an electronic device, the method comprising:
detecting direct current (DC) power output from the electronic device
determining a power supply mode of a power supply device for the electronic device, based on at least one of a feedback signal from the converter and a control signal from an external circuit connected to the power supply device;
switching connection between a capacitor and a discharge device, the capacitor being connected to an alternating current (AC) power source according to the determined power supply mode and the discharge device discharging electric charges accumulated in the capacitor,
wherein the power supply mode comprises an on-mode including a standby mode or a normal operation mode, which are states where the AC power is supplied, or an off-mode, which is a state where the AC power is not supplied, and wherein the on-mode is a state where the output DC power is detected, and the off-mode is a state where the output DC power is not detected; and the determining of the power supply mode comprises determining whether a control signal corresponding to the power supply mode is received,
wherein the switching of the connection between the capacitor and the discharge device comprises disconnecting the capacitor from the discharge device when the determined control signal is a first logic level signal corresponding to the on-mode, and connecting the capacitor and the discharge device when the determined control signal is a second logic level signal corresponding to the off-mode or when determined that the control signal is not received.

* * * * *

UNITED STATES PATENT AND TRADEMARK OFFICE
CERTIFICATE OF CORRECTION

PATENT NO. : 8,593,837 B2
APPLICATION NO. : 12/659372
DATED : November 26, 2013
INVENTOR(S) : Hyung-Won Hong Page 1 of 1

It is certified that error appears in the above-identified patent and that said Letters Patent is hereby corrected as shown below:

On the Title Page, item 30, In Column 1 (Foreign Application Priority Data), Line 1, delete "Sep. 3, 2008" and insert -- Sep. 3, 2009 --, therefor.

In the Claims

In Column 13, Line 61, In Claim 11, delete "o-n mode" and insert -- on-mode --, therefor.

Signed and Sealed this
First Day of April, 2014

Michelle K. Lee
*Deputy Director of the United States Patent and Trademark Office*